Oct. 20, 1970 T. E. OSBORNE 3,535,701

ADDRESSING APPARATUS

Filed May 22, 1967

INVENTOR
THOMAS E. OSBORNE

BY Roland I. Griffin

ATTORNEY

United States Patent Office 3,535,701

Patented Oct. 20, 1970

3,535,701

ADDRESSING APPARATUS

Thomas E. Osborne, San Francisco, Calif., assignor to Hewlett-Packard Company, Palo Alto, Calif., a corporation of California Filed May 22, 1967, Ser. No. 640,251

Int. Cl. G11c *7/00;* H03k *17/64, 3/45*

U.S. Cl. 340—174 3 Claims

ABSTRACT OF THE DISCLOSURE

Any one of a plurality of lines each including a capacitor is addressed during a read cycle by selectively energizing a transistor switch to provide a current signal that flows in one direction along the line and charges the capacitor. The same line is automatically addressed during a subsequent write cycle by energizing a transistor switch to discharge the capacitor that was charged during the read cycle and thereby provide a current signal that flows in the opposite direction along the line.

BACKGROUND OF THE INVENTION

This invention relates to addressing apparatus such as may be used with core memories.

In conventional memories the digital information read from a selected memory location during a read cycle is normally written back into the same memory location during a subsequent write cycle to prevent loss of the read-out information. The selected memory location is addressed during the read cycle by a current signal that flows in one direction to read digital information from the selected memory location. It is addressed during the write cycle by a current signal that flows in the opposite direction to write the same digital information back into the selected memory location. Typically, the reversal in the direction of flow of these address current signals is achieved by employing two power supplies of opposite polarity, by employing a single power supply with a separate polarity-reversing transformer circuit for each address line, or by employing separate sets of read and write address lines for the memory locations. All of these current reversal means require full power during both the read and the write cycles. Furthermore, they substantially increase the amount of circuitry and hence the cost of the addressing apparatus.

SUMMARY OF THE INVENTION

Accordingly, it is the principal object of this invention to provide addressing apparatus for saving power and circuitry while automatically providing a current signal that flows in the required direction on the appropriate address line during the write cycle.

This object is accomplished according to the illustrated embodment of this invention by including a capacitor in each address line of the memory. A separate transistor switch is connected to each address line and is responsive to energization during a read cycle for providing a current signal that flows in one direction along the connected address line and charges the capacitor of that line. Another transistor switch is connected by a separate diode to each address line and is responsive to energization during a subsequent write cycle for discharging any capacitor that was charged during the read cycle to automatically provide a current signal that flows in the opposite direction on any address line that was addressed during the read cycle. A current limiter is included in the charge and discharge paths for the capacitors to limit each of the current signals that flow during the read and the write cycles to a substantially constant magnitude.

DESCRIPTION OF THE PREFERRED EMBODIMENT

Figure 1:
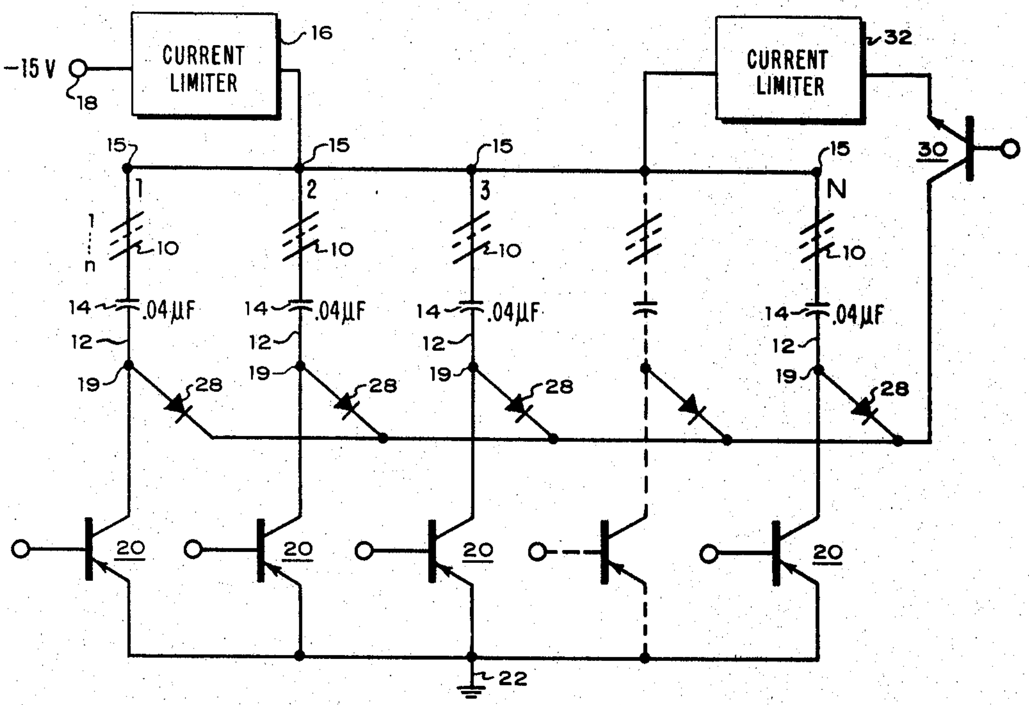
FIG. 1 is a schematic diagram of addressing apparatus according to the preferred embodiment of this invention.

Referring to FIG. 1, addressing apparatus is shown that may be used, for example, with a memory device such as the core memory described by J. W. Forrester in his U.S. Pat. 2,736,880 entitled "Multicoordinate Digital Information Storage Device" and issued on Feb. 28, 1956. Such core memories comprise a plurality of magnetic cores 10 arrayed in $n$ rows and N columns and provided with $n$ $x$-coordinate address lines (not shown) and N $y$-coordinate address lines 12. The $n$ $x$-coordinate address lines are formed by providing each core 10 in the same row with an $x$-coordinate winding that is connected in series with the other $x$-coordinate windings of the same row. Similarly, the N $y$-coordinate address lines 12 are formed by providing each core 10 in the same column with a $y$-coordinate winding that is connected in series with the other $y$-coordinate windings of the same column. The cores 10 are used as coincident current devices that are unresponsive to a single current signal of a given magnitude while responding to the simultaneous application of two such current signals. Thus, during the read cycle digital information is read from a selected memory location or core by simultaneously applying current signals in one direction to the $x$- and $y$-coordinate address lines associated with that core. This same digital information is written back into the selected core during the subsequent write cycle by simultaneously applying current signals in the opposite direction to the $x$- and $y$-coordinate address lines associated with that core.

The addressing apparatus used with the $n$ $x$-coordinate address lines and with the N $y$-coordinate address lines is identical. Thus, to avoid unnecessary repetition the addressing apparatus of the preferred embodiment of this invention is shown in the drawing and will now be described only as it is used with the N $y$-coordinate address lines 12. A separate capacitor 14 is connected in series with each address line 12. These capacitors 14 may be connected in or to the address lines 12 on either side of the array of cores 10. In any case, they are regarded as being included in the address lines 12 for purposes of this specification and the claims appended hereto. On one side of the array of cores 10, the end terminals 15 of the address lines 12 are connected in common to a current limiter 16. This current limiter 16 is connected to the negative terminal of a power supply 18. On the other side of the array of cores 10, the end terminal 19 of each address line 12 is connected to a separate read transistor switch 20 associated with that line. Each read transistor switch 20 has its collector connected in series with the capacitor 14 of the associated address line 12 and has its emitter connected to a point of reference potential such as ground 22. During the read cycle, an energizing current signal 24 such as the one shown in FIG. 2(*a*) is applied to the base of the read transistor switch 20 connected to the line 12 that must be addressed to read information from a selected core 10. The energized read transistor switch 20 causes a read address current signal 26 such as the one shown in FIG. 2(*b*) to flow along its associated address line 12 and through the current limiter 16 to the negative terminal of power supply 18. As this read address current signal 26 flows along the associated address line 12, it charges the capacitor 14 connected in that address line. A voltage therefore builds up across this capacitor 14 since at the beginning of the read cycle the voltage across each capacitor is substantially zero volts.

Figure 2:
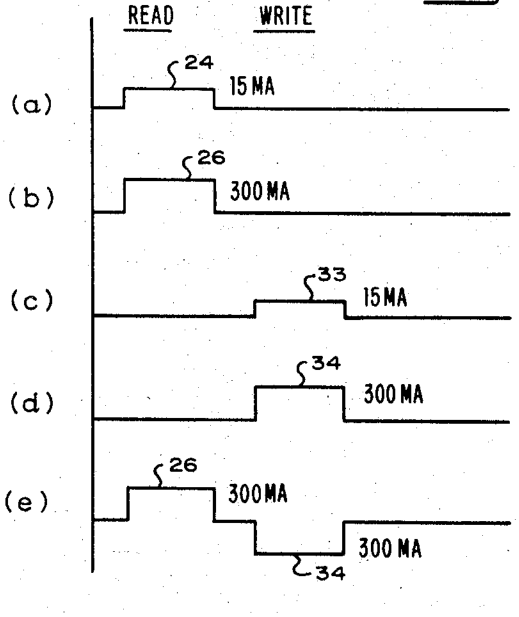
FIGS. 2(*a*)–(*e*) are exaggerated current waveform diagrams illustrating the operation of the addressing apparatus of FIG. 1.

The end terminal 19 of each address line 12 is also connected by a separate diode 28 to the collector of a single write transistor switch 30 of opposite conductivity type from the read transistor switches 20. This write transistor switch 30 has its emitter connected by a current limiter 32 to the commonly connected end terminals 15 of the address lines 12. During the write cycle, an energizing current signal 33 such as the one shown in FIG. 2(*c*) is applied to the base of write transistor switch 30. The energization of the write transistor switch 30 forward biases the diode 28 connected to the address line 12 in which a capacitor 14 was charged during the read cycle. This discharges that capacitor 14 back to substantially zero volts by causing a write address current signal 34 such as the one shown in FIG. 2(*d*) to flow along a capacitor discharge path comprising the forward-biased diode 28, the collector-emitter circuit of the energized write transistor switch 30, the current limiter 32, and the address line 12 in which that capacitor is connected. Thus, during the write cycle the write address current signal 34 automatically flows along the address line 12 that was addressed during the preceding read cycle. Since the write address current signal 34 is produced by discharging a capacitor 14 that was charged by the preceding read address current signal 26, the read address current signal and the write address current signal automatically flow in opposite directions as indicated in FIG. 2(*e*). The current limiters 16 and 32 limit each of the read and write address current signals 26 and 34 to substantially a constant magnitude.

Figure 3:
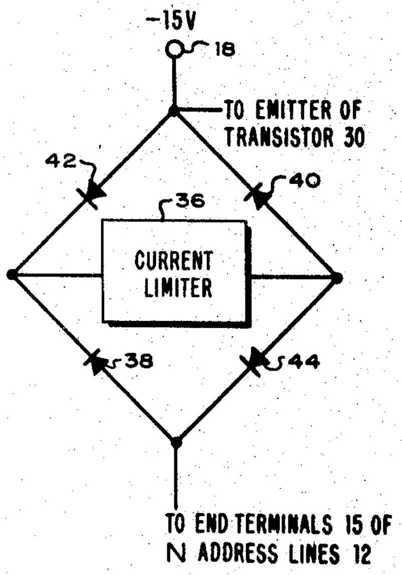
FIG. 3 is a schematic diagram showing how a single current limiter may be used in place of the two current limiters of FIG. 1.

As shown in FIG. 3, the current limiters 16 and 32 of FIG. 1 may be replaced by a single current limiter 36. This current limiter 36 is connected in a diode bridge between the negative terminal of the power supply 18 and the commonly connected end terminals 15 of the N address lines 12. During the read cycle, the read address current signal 26 therefore flows from the addressed line 12 through diode 38, current limiter 36, and diode 40 to the negative terminal of power supply 18. The emitter of write transistor switch 30 is connected to the junction between diodes 40 and 42. Thus, during the write cycle, the write address current signal 34 flows from the emitter of write transistor switch 30 through diode 42, current limiter 36, and diode 44 into the address line 12 in which the capacitor 14 that was charged during the read cycle is connected.

The above-described addressing apparatus conserves both power and circuitry since the write address current signal 34 is derived from charge stored by the preceding read address current signal 26 and is automatically applied in the opposite direction to each address line 12 addressed by the preceding read address current signal 26. These savings substantially reduce the cost of the addressing apparatus.

I claim:

1. Addressing apparatus comprising:

a plurality of lines to be selectively addressed, each of said lines including a capacitor, passing through an array of magnetic cores, and including at least one winding coupled to an associated different one of said magnetic cores;

a constant current charging circuit including a constant current limiter, a plurality of read selection transistors each connected in series with an associated different one of said lines between a source of supply potential and a source of reference potential, each of said read selection transistors having a base electrode connected to an associated read selection input, having a collector electrode connected in series with an associated different one of said lines, having an emitter electrode connected to said source of reference potential, and being responsive to application of a reading selection control signal at its associated read selection input for causing a constant current signal to flow in one direction along its associated line to address that line, charge the capacitor thereof, and select at least one of said magnetic cores from which digital information is to be read during a first address cycle; and a constant current discharging circuit including a constant current limiter, a plurality of diodes each connected to one end of an associated different one of said lines at a point between the capacitor thereof and the collector of the read selection transistor associated therewith, a write transistor having a base electrode connected to an associated write input, having a collector-emitter circuit serially connected between each of said diodes and the other end of each of said lines, and being responsive to application of a writing control signal at its associated write input for discharging any of said capacitors charged during the first address cycle to automatically cause a constant current signal to flow in the opposite direction along any of said lines addressed during the first address cycle and thereby reselect each magnetic core selected during the first address cycle and into which digital information is to be written during a second address cycle.

2. Addressing apparatus as in claim 1 wherein:

said constant current charging circuit includes a first constant current limiter serially connected between each of said lines and one of said sources of potential; and said constant current discharging circuit includes a second constant current limiter serially connected between said other end of each of said lines and said plurality of diodes.

3. Addressing apparatus as in claim 1 wherein:

said constant current charging circuit includes a first unidirectional conduction path for conducting current flowing in said one direction along any of said lines addressed during the first address cycle, said first unidirectional conduction path including a constant current limiter and being serially connected between each of said lines and one of said sources of potential; and said constant current discharging circuit includes a second unidirectional conduction path for conducting current flowing in said opposite direction along any of said lines addressed during the second address cycle, said second unidirectional conduction path including the same constant current limiter as the first unidirectional conduction path and being serially connected between each of said lines and said write transistor.

References Cited

UNITED STATES PATENTS

| | | | |
|---|---|---|---|
| 3,025,411 | 3/1962 | Rumble | 340—174 XR |
| 3,187,260 | 6/1965 | Dove | 340—174 XR |
| 3,374,402 | 3/1968 | Derc | 307—246 XR |
| 3,421,027 | 1/1969 | Maynard et al. | 307—321 XR |

STANLEY M. URYNOWICZ, Primary Examiner

G. M. HOFFMAN, Assistant Examiner

U.S. Cl. X.R.

307—110, 246, 270